(12) United States Patent
Yoon et al.

(10) Patent No.: US 11,652,370 B2
(45) Date of Patent: May 16, 2023

(54) APPARATUS AND METHOD FOR PROVIDING COMPATIBILITY IN WIRELESS POWER TRANSMISSION SYSTEM

(71) Applicant: GE Hybrid Technologies, LLC, Niskayuna, NY (US)

(72) Inventors: Yong Gu Yoon, Osan-si (KR); Choon Kil Jung, Seoul (KR)

(73) Assignee: GE Hybrid Technologies, LLC, Niskayuna, NY (US)

( * ) Notice: Subject to any disclaimer, the term of this patent is extended or adjusted under 35 U.S.C. 154(b) by 41 days.

(21) Appl. No.: 16/841,898

(22) Filed: Apr. 7, 2020

(65) Prior Publication Data

US 2020/0235615 A1  Jul. 23, 2020

Related U.S. Application Data

(63) Continuation of application No. 16/298,445, filed on Mar. 11, 2019, now Pat. No. 10,651,693, which is a
(Continued)

(51) Int. Cl.
*H02J 50/12* (2016.01)
*H02J 50/40* (2016.01)
(Continued)

(52) U.S. Cl.
CPC ............. *H02J 50/40* (2016.02); *H02J 50/10* (2016.02); *H02J 50/12* (2016.02); *H02J 50/80* (2016.02); *H02J 50/90* (2016.02)

(58) Field of Classification Search
USPC ........................................................ 307/104
See application file for complete search history.

(56) References Cited

U.S. PATENT DOCUMENTS 8,159,364 B2   4/2012   Zeine
10,270,297 B2   4/2019   Yoon et al.
(Continued)

FOREIGN PATENT DOCUMENTS

CN   101919139   12/2010
CN   102082451    6/2011
(Continued)

OTHER PUBLICATIONS

"CN Application No. 201380041772.3 Chinese Office Action", dated Oct. 28, 2016, 14 pages.
(Continued)

*Primary Examiner* — Toan T Vu
*Assistant Examiner* — Xuan Ly
(74) *Attorney, Agent, or Firm* — Delizio, Peacock, Lewin & Guerra, PLLC; John F. Guerra

(57) ABSTRACT

The present disclosure relates to a method for providing compatibility with a wireless power transmitting device in a wireless power transmitting system. The method includes the steps of: detecting a wireless power receiving device on the basis of a load change; transmitting a request signal for requesting information for a receiving device to the wireless power receiving device; receiving the information for the receiving device from the wireless power receiving device, wherein the information selectively includes version information on standard technical specifications for realizing the wireless power receiving device; and, when the version information is included in the information for the receiving device, performing a wireless power transmitting operation according to the standard technical specifications corresponding to the version information.

12 Claims, 4 Drawing Sheets

Related U.S. Application Data continuation of application No. 14/419,418, filed as application No. PCT/KR2013/007011 on Aug. 2, 2013, now Pat. No. 10,270,297.

(60) Provisional application No. 61/679,789, filed on Aug. 6, 2012.

(51) Int. Cl.
   *H02J 50/80* (2016.01)
   *H02J 50/90* (2016.01)
   *H02J 50/10* (2016.01)

(56) References Cited

U.S. PATENT DOCUMENTS

| | | | |
|---|---|---|---|
| 2009/0271047 | A1 | 10/2009 | Wakamatsu |
| 2009/0322281 | A1 | 12/2009 | Kamijo et al. |
| 2010/0225272 | A1* | 9/2010 | Kirby .............. H02J 7/025 320/108 |
| 2011/0127843 | A1 | 6/2011 | Karaoguz et al. |
| 2011/0127951 | A1 | 6/2011 | Walley et al. |
| 2011/0140538 | A1 | 6/2011 | Jung et al. |
| 2012/0235636 | A1* | 9/2012 | Partovi ............ B60L 53/122 320/108 |
| 2012/0306285 | A1* | 12/2012 | Kim .............. H02J 7/00304 307/104 |
| 2013/0002038 | A1* | 1/2013 | Lee .............. H02J 50/12 307/104 |
| 2015/0214745 | A1 | 7/2015 | Yoon et al. |
| 2017/0018954 | A1 | 1/2017 | Lee et al. |
| 2019/0207436 | A1 | 7/2019 | Yoon et al. |

FOREIGN PATENT DOCUMENTS

| | | |
|---|---|---|
| JP | 2008295191 | 12/2008 |
| JP | 4544338 | 9/2010 |
| JP | 2011045190 | 3/2011 |
| JP | 2011152008 | 8/2011 |
| JP | 2012034426 | 2/2012 |
| JP | 2012095435 | 5/2012 |
| JP | 2012511891 | 5/2012 |
| KR | 20100002171 | 1/2010 |
| KR | 20110009228 | 1/2011 |
| WO | 2010068062 | 6/2010 |
| WO | 2010093973 | 8/2010 |
| WO | 2014025168 | 2/2014 |

OTHER PUBLICATIONS

"CN Application No. 201380041772.3 Second Chinese Office Action", dated Mar. 7, 2017, 5 pages.

"International Application No. PCT/KR2013/007011 International Search Report", dated Oct. 24, 2013, 8 pages.

"Japanese Application No. 2015-526461 Notification of Reason for Refusal", dated Aug. 2, 2017, 3 pages.

"Korean Application No. 10-2015-7002811 Notification of Reason for Refusal", dated Dec. 26, 2016, 7 pages.

"Korean Application No. 10-2015-7002811 Written Opinion", dated Feb. 22, 2017, 5 pages.

"PCT Application No. PCT/KR2013/007011 International Preliminary Report on Patentability", dated Feb. 19, 2015, 9 pages.

"Qi System Description Wireless Power Transfer", Wireless Power Consortium, vol. 1:Low Power, Part 1:Interface Definition, Version 1.0.1, Oct. 2010, 88 pages.

"U.S. Appl. No. 14/419,418 Final Office Action", dated Jun. 29, 2018, 21 pages.

"U.S. Appl. No. 14/419,418 Office Action", dated Oct. 6, 2017, 53 pages.

"U.S. Appl. No. 16/298,445 Office Action", dated Jul. 25, 2019, 21 pages.

* cited by examiner

APPARATUS AND METHOD FOR PROVIDING COMPATIBILITY IN WIRELESS POWER TRANSMISSION SYSTEM

RELATED APPLICATIONS

This application is a continuation application and claims priority benefit to U.S. Non-Provisional application Ser. No. 16/298,445, filed Mar. 11, 2019, which claims the benefit of priority to U.S. Non-Provisional application Ser. No. 14/419,418, filed Feb. 3, 2015, which is a national stage of International Application No. PCT/KR2013/007011, filed Aug. 2, 2013, which claims the benefit of priority to U.S. Provisional Application No. 61/679,789, filed Aug. 6, 2012, in the United States Patent Office and Trademark Office. All disclosures of the documents named above are incorporated herein by reference.

BACKGROUND

Technical Field

The preset disclosure relates to wireless charging, and more particularly, to an apparatus and a method for providing compatibility in a wireless power transmission system.

Background Description

In general, in order to charge portable terminals such as a cellular phone, a notebook, and a personal digital assistant (PDA), the portable terminals should receive electric energy (alternatively, power) from an external charger. The portable terminals include a battery cell storing the supplied electric energy and a circuit for charging and discharging (supplying the electric energy to the portable terminals) the battery cell.

An electrical connection mode between the charger for charging the electric energy in the battery cell and the battery cell include a terminal supply mode that receives commercial power and converts the received commercial power into voltage and current corresponding to the battery cell to supply the electric energy to the battery cell through a terminal of the corresponding battery cell.

The terminal supply mode is companied by the use of a physical cable or electric wire. Therefore, when a lot of terminal supply mode apparatuses are handled, a lot of cables occupy a significant workspace and are difficult to arrange and external appearance is not good. Further, the terminal supply mode may cause an instantaneous discharge phenomenon due to different potential differences among terminals, occurrence of damage and fire by foreign substances, natural discharge, deterioration of life-span and performance of a battery pack, and the like.

In recent year, in order to solve the problem, a charge system (hereinafter, referred to as a wireless power transmission system) and control methods using the wireless power transmission mode has been presented. The wireless power transmission mode is also referred to as a contactless power transmission mode or a no point of contact power transmission mode. The wireless power transmission system is constituted by a wireless power transmitting device supplying the electric energy in the wireless power transmission mode and a wireless power receiving device receiving the electric energy wirelessly supplied from the wireless power transmitting device to charge the battery cell.

An operation of the wireless power transmitting device or receiving device may be defined by a standardized technical specification. For example, a wireless power consortium (WPC) standardizes technical matters that enable wireless charging based on a magnetic induction mode. Wireless power transmitting device or receiving devices which are actually commercialized are manufactured according to a specific version standard technical specification (hereinafter, referred to as 'standard'). The version of the wireless charging standard may be upgraded and when a legacy version standard and a new version standard are different from each other, a legacy version product and a new version product may not be compatible to each other.

For example, a step in which the wireless power transmitting device authenticates and verifies the wireless power receiving device is performed according to a specific packet structure and when the specific packet structure is changed or a new packet structure is rather defined as the legacy version standard is upgraded to the new version standard, a problem in compatibility between the legacy version product and the new version product may occur.

SUMMARY

Technical Problem

The present disclosure has been made in an effort to provide an apparatus and a method for providing compatibility in a wireless power transmission system.

Technical Solution

In one aspect of the present disclosure, provided is a method for providing compatibility with a wireless power transmitting device in a wireless power transmission system. The method includes: detecting a wireless power receiving device on the basis of a load change; transmitting a request signal for requesting information for a receiving device to the wireless power receiving device; receiving the information for the receiving device from the wireless power receiving device, wherein the information selectively includes version information on standard technical specifications for realizing the wireless power receiving device; and, when the version information is included in the information for the receiving device, performing a wireless power transmitting operation according to the standard technical specifications corresponding to the version information.

The information on the receiving device may further include a level of reception power which the wireless power receiving device receives from the wireless power transmitting device.

The method may further include, when the version information is not included in the information on the receiving device, performing the wireless power transmitting operation according to standard technical specifications corresponding to a version other than the version information.

The version information may be a new version and the other version may be a legacy version.

In another aspect of the present disclosure, provided is a wireless power transmitting device for providing compatibility in a wireless power transmission system. The wireless power transmitting device includes: a primary coil transmitting wireless power based on magnetic induction or magnetic resonance; an electric drive unit connected to the primary coil and applying an electric drive signal to the primary coil to allow the primary coil to generate the magnetic induction or the magnetic resonance; and a control unit connected to the electric drive unit and generating a control signal for controlling the electric drive signal and detecting the load change to recognize that a wireless power receiving device exists in or approaches the wireless power transmitting device. Herein, the control unit transmits a request signal for requesting information on the receiving device to the wireless power receiving device, receives the information on the receiving device from the wireless power receiving device, when the information on the receiving device selectively includes version information on standard technical specifications for realizing the wireless power receiving device as a response to the request signal, and when the version information is included in the information on the receiving device, performs a wireless power transmitting operation according to the standard technical specifications corresponding to the version information.

In yet another aspect of the present disclosure, provided is a method for providing compatibility with a wireless power receiving device in a wireless power transmission system. The method includes: receiving a request signal for requesting information on a receiving device to a wireless power transmitting device; transmitting the information on the receiving device from the wireless power transmitting device, when the information selectively includes version information on standard technical specifications for realizing the wireless power receiving device as a response to the request signal; and when the version information is included in the information on the receiving device, performing a wireless power receiving operation according to the standard technical specifications corresponding to the version information.

In still another aspect of the present disclosure, provided is a wireless power receiving device for providing compatibility in a wireless power transmission system. The wireless power receiving device includes: a secondary coil receiving wireless power from a wireless power transmitting device based on magnetic induction or magnetic resonance; a rectification unit providing full-wave rectification for an AC waveform generated in the secondary coil by the magnetic induction or the magnetic resonance; and a control unit receiving a request signal for requesting information on the receiving device from the wireless power transmitting device, transmitting the information on the receiving device selectively including version information of standard technical specifications for realizing the wireless power receiving device to the wireless power transmitting device, and performing a wireless power receiving operation according to the standard technical specifications corresponding to the version information when the version information is included in the information on the receiving device.

When the version information is not included in the information on the receiving device, the control unit may perform the wireless power receiving operation according to standard technical specifications corresponding to a version other than the version information.

Advantageous Effects

There is no problem in that a system having the existing packet structure operates even in changing a packet structure by changing a specification prescribed in a wireless power transmission system and compatibility can be provided.

BRIEF DESCRIPTION OF THE FIGURES

These and/or other aspects and advantages of the disclosure will become apparent and more readily appreciated from the following description of the embodiments, taken in conjunction with the accompanying drawings of which.

DETAILED DESCRIPTION

A term called "wireless power" used hereinbelow is used to mean predetermined form of energy associated with an electric field, a magnetic field, an electromagnetic field, and the like which are transmitted from a transmitter without using physical electromagnetic conductors. The wireless power may be called a power signal and mean oscillating magnetic flux enclosed by a primary coil and a secondary coil. For example, power conversion in a system in order to wirelessly charge devices including a mobile phone, a cordless phone, an iPod, an MP3 player, a headset, and the like will be described herein. In general, a basic principle of transferring the wireless power includes, for example, both a magnetic induction coupling mode and a magnetic resonance coupling (alternatively, resonance induction) mode.

Figure 1:
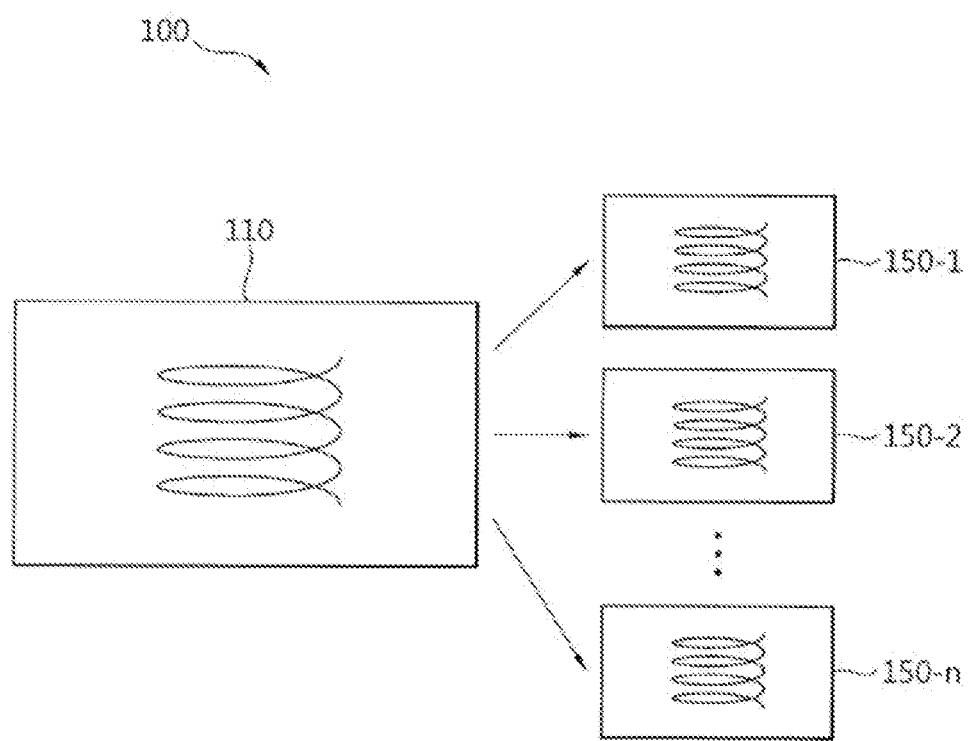
FIG. 1 illustrates components of a wireless power transmission system according to an embodiment of the present disclosure.

FIG. 1 illustrates components of a wireless power transmission system according to an embodiment of the present disclosure.

Referring to FIG. 1, the wireless power transmission system 100 includes a wireless power transmitting device 110 and one wireless power receiving device 150-1 or n wireless power receiving devices 150-1 to 150-*n*. Multiple wireless power transmitting devices 100 may also exist.

The wireless power transmitting device 110 includes a primary core generating magnetic induction or magnetic resonance. The primary core may include one or more primary coils. The wireless power transmitting device 100 may have a predetermined appropriate form. In some implementations, the shape of the wireless power transmitting device 100 is a flat platform having a power transmission surface and the respective wireless receiving devices 150-1 to 150-*n* may be positioned on the platform or therearound.

When the wireless receiving devices 150-1 to 150-*n* may be separated from the wireless power transmitting device 110 and the respective wireless power receiving devices 150-1 to 150-*n* are positioned around the wireless power transmitting device 110, the wireless receiving devices 150-1 to 150-*n* include a secondary core coupled with the magnetic induction or the magnetic resonance generated by the primary corer of the wireless power transmitting device 110. The secondary core may include one or more secondary coils.

The wireless power transmitting device 110 transmits power to the wireless power receiving devices 150-1 to 150-*n* without a direct electrical contact. In this case, it is assumed that the primary core and the secondary core are magnetic induction coupled or resonance induction coupled with each other. The primary coil or the secondary oil may have predetermined appropriate forms, but may be, for example, a copper wire wound around a high permeable formation material such as ferrite or amorphous metal.

The wireless power receiving devices 150-1 to 150-*n* are generally connected to an external load (not illustrated, herein, referred to as an actual load of the wireless power receiving device) to supply power wirelessly received from the wireless power transmitting device 110 to the external load. For example, each of the wireless power receiving devices 150-1 to 150-n may consume power or carry the consumed power to a storage object like a portable electric or electronic device or a rechargeable battery cell or battery.

n wireless power receiving devices 150-1 to 150-n may be configured to operate according to the same version standard technical specification (hereinafter, referred to as 'standard'). On the contrary, n wireless power receiving devices 150-1 to 150-n may be configured to operate according to any one of standards including version A, version B, and the like. For example, the wireless power receiving device 150-1 may operate according to the version A standard, the wireless power receiving device 150-2 may operate according to the version B standard, and the wireless power receiving device 150-3 may operate according to the version C standard.

When n wireless power receiving devices 150-1 to 150-n operate according to the same version standard, the wireless power transmitting device 110 may transmit wireless power to n wireless power receiving devices 150-1 to 150-n in spite of supporting only the same version standard. However, when n wireless power receiving devices 150-1 to 150-n operate according to different-version standards, the wireless power transmitting device 110 need to support all-version standards. That is, the wireless power transmitting device 110 needs to be manufactured to be compatible to all-version standards.

An identification phase will be described as an example. The wireless power transmitting device 110 performs the identification phase of identifying the wireless power receiving devices 150-1 to 150-n before transmitting the wireless power. In the authentication phase, the wireless power receiving devices 150-1 to 150-n transmit an identification packet indicating ID information thereof to the wireless power transmitting device 110. Then, the wireless power transmitting device 110 may identify the wireless power receiving devices 150-1 to 150-n from the respective packet. However, a structure of the identification packet may be changed according to the version of the standard or a new packet may be introduced.

For example, in the version A standard, identification packet a is used and while the standard is upgraded to the version B, the identification packet a may be changed to a' or the identification packet a may be removed and identification packet b may be newly defined. When the wireless power transmitting device 110 is realized operate only in the version A standard, the wireless power transmitting device 110 may recognize the identification packet a, but may not recognize the identification packet a' or the identification packet b. That is, the wireless power transmitting device 110 may not identify the wireless power receiving device that follows the version B standard. Then, the wireless power transmitting device 110 may normally transmit the wireless power because the wireless power receiving device that follows the version A standard, but since the wireless power receiving device that follows the version B standard is not identified, the wireless power transmitting device 110 may not normally transmit the wireless power hereinafter, and as a result, a problem in compatibility occurs.

Accordingly, the wireless power transmitting device 110 needs to be realized to have compatibility with the wireless power receiving devices 150-1 to 150-n according to various versions. A method for the wireless power transmitting device 110 to operate in all of various-version standards (e.g., the version A standard and the version B standard is required and signaling associated with the method is required.

Figure 2:
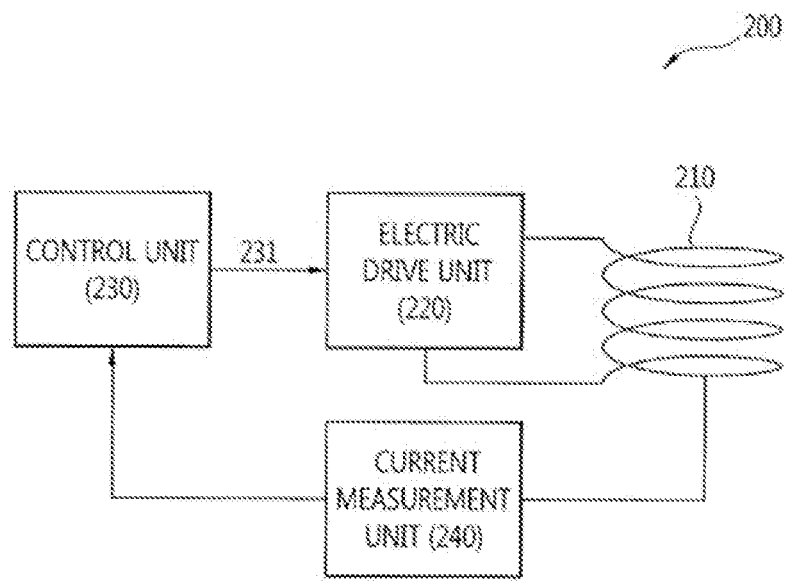
FIG. 2 is a block diagram illustrating a wireless power transmitting device according to an embodiment of the present disclosure.

FIG. 2 is a block diagram illustrating a wireless power transmitting device according to an embodiment of the present disclosure.

Referring to FIG. 2, the wireless power transmitting device 200 includes a primary coil 210, an electric drive unit 220, a control unit 230, and a current measurement unit 240.

The electric drive unit 220 is connected to the primary coil 210 to apply an electric drive signal such as AC current I, thereby allowing the primary coil 210 to generate the magnetic induction or the magnetic resonance. The electric drive unit 220 includes an inverter.

The control unit 230 is connected to the electric drive unit 220 and generates a control signal 231 to control an electric drive signal of the electric drive unit 220. In addition, the control unit detects a change of a load to recognize existence or approach of the load such as the wireless power receiving device in or to the wireless power transmitting device 200. Since the wireless power is transmitted when the load is the wireless power receiving device, the control unit 230 enters the identification phase for verifying whether the approached load is the wireless power receiving device and the version of the wireless power receiving device. In this case, the control unit 230 generates a request signal or a request packet for requesting information on the receiving device to the wireless power receiving device and transmits the generated request signal or request packet to the wireless power receiving device. The information on the receiving device may be called status information of the receiving device.

In this case, the wireless power receiving device generates the information on the receiving device as a response to the request signal or the request packet and transmits the generated information to the wireless power transmitting device 200. The information on the receiving device may be transmitted a response packet format.

As an embodiment, the information on the receiving device may selectively include version information of the wireless power receiving device. The version information is selectively included in the information on the receiving device to identify two versions. For example, the version information=A is included in the information on the receiving device, the wireless power transmitting device can see that the wireless power receiving device is realized based on the version A standard. For example, when the version information is not included in the information on the receiving device (that is, the version information does not exist in the information on the receiving device), the wireless power transmitting device can see that the wireless power receiving device is realized based on not the version A standard but the version B standard. That is, the wireless power transmitting device may identify which version standard the wireless power receiving device is based on according to whether the version information being included in the information on the receiving device. Herein, the version A and the version B may correspond to a new version and a legacy version, respectively. As described above two versions may be identified by inclusion or non-inclusion of the version information. That is, since the version is identified by existence of a specific packet (alternatively, signal) in the information of the receiving device, only information of 1 bit may be allocated for the specific packet (alternatively, signal). Therefore, there is an effect that overhead is reduced. In this case, the control unit 230 may identify the version according to whether the specific signal being input. For example, the control unit 230 checks whether the specific signal is input and if the specific signal is input, the control unit 230 determines that the corresponding wireless power receiving device is realized based on the new version standard and if the specific signal is not input, the control unit 230 may determine that the corresponding wireless power receiving device is realized based on the legacy version standard.

As another embodiment, the information on the receiving device may requisitely include the version information of the wireless power receiving device. When the version is A, B, or C, the version A, B, or C directly indicates the version of the wireless power receiving device like the version information=A, B, or C.

As yet another embodiment, the information on the receiving device selectively or requisitely includes the version information of the wireless power receiving device and may include other additional information (e.g., a power level required by the wireless power receiving device). Herein, the power level required by the wireless power receiving device may be the power level required by the wireless power receiving device itself. Alternatively, when power actually received by the wireless power receiving device is different from required power, the power level may be expressed as information to request rise (+) or drop (−) of transmission power to the wireless power transmitting device. When the rise (+) or the drop (−) of the transmission power is requested, the wireless power transmitting device raises or drops a numerical value of the wireless power currently transmitted by a predetermined amount.

The control unit 230 that receives the information on the receiving device verifies, based on the information on the receiving device, which version standard the wireless power receiving device has implemented. In more detail, in the embodiment in which the version information is selectively included in the information on the receiving device to identify the version, the control unit 230 first verifies whether the version information is included in the information on the receiving device. When the version information=A is included in the information on the receiving device, the control unit 230 determines that the wireless power receiving device is realized based on the version A standard. On the contrary, when the version information=A is not included in the information on the receiving device, the control unit 230 determines that the wireless power receiving device is realized based on the version B standard.

Alternatively, in the embodiment in which the version information directly indicates the version of the wireless power receiving device, in the case of the version information=A, the control unit 230 determines that the wireless power receiving device is realized based on the version A standard and in the case of the version information=B, the control unit 230 determines that the wireless power receiving device is realized based on the version B standard.

In addition, the control unit 230 performs a work or a procedure prescribed in the corresponding version standard. For example, when it is verified that the wireless power receiving device is realized based on the version A standard, the control unit 230 performs a work or a procedure prescribed in the version A standard. For example, when it is verified that the wireless power receiving device is realized based on the version B standard, the control unit 230 performs a work or a procedure prescribed in the version B standard. As described above, the wireless power transmitting device 200 operates for each version of the wireless power receiving device by a predetermined process to have intercompatibility even though an information packet which is mutually transmitted and received is changed according to the version.

The current measurement unit 240 measures current I that flows on the primary coil 210. In particular, the current measured by the current measurement unit 240 may be AC current. The current measurement unit 240 may be a current sensor. Alternatively, the current measurement unit 240 may be a transformer that decreases high current that flows on the primary coil to low current and uses the low current.

The current measurement unit 240 acquires a current measurement value Imeaured from the current that flows on the primary coil 210 and inputs the acquired current measurement value in the control unit 230. The current measurement value Imeaured may be converted into a DC numerical value suitable for the control unit 230 to recognize. That is, the current measurement unit 240 measures relatively high AC current that flows on the primary coil 210, maps the measured high current to the current measurement value Imeaured which is a numerical value suitable for the control unit 230 to analyze, and inputs the current measurement value Imeaured in the control unit 230.

Figure 3:
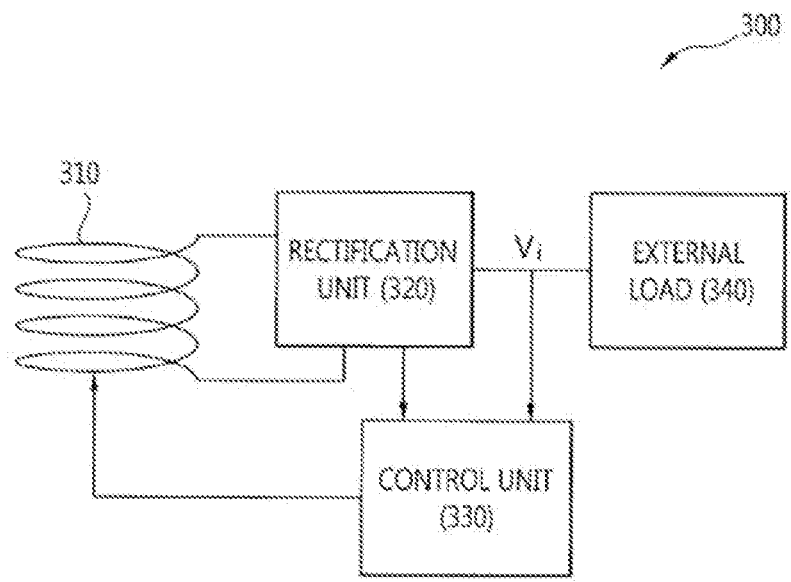
FIG. 3 is a block diagram illustrating a wireless power receiving device according to the embodiment of the present disclosure.

FIG. 3 is a block diagram illustrating a wireless power receiving device according to the embodiment of the present disclosure.

Referring to FIG. 3, the wireless power receiving device 300 includes a secondary coil 310, a rectification unit 320, and a control unit 330.

The rectification unit 320 provides full-wave rectification of an AC waveform generated in the secondary coil 310. For example, the rectification unit 320 may use four diodes in a full bridge configuration. Further, the rectification unit 320 may provide power to the control unit 330 and an external load 340.

The control unit 330 performs operations such as packet generation, packet transmission, and wireless power transmission control by receiving the power from the rectification unit 320. As one example, a load modulation technique may be used in order to transmit the packet. In this case, the packet is transmitted through the secondary coil 310 and a frequency band is used, which is the same as a frequency band for transmitting the wireless power. As another example, a separate frequency band is used, which is different from the frequency band for transmitting the wireless power in order to transmit the packet and the packet may be transmitted through a technique such as radio frequency identification (RFID), Bluetooth, or near field communication (NFC).

The control unit 330 receives the request signal or the request packet for requesting the information on the receiving device from the wireless power transmitting device when the wireless power receiving device enters the identification phase.

In this case, the control unit 330 generates the information on the receiving device as a response to the request signal or the request packet and transmits the generated information to the wireless power transmitting device.

As an embodiment, the information on the receiving device may selectively include the version information of the wireless power receiving device 300. The version information is selectively included in the information on the receiving device, and as a result, the control unit 330 identifies two versions. For example, the control unit 330 makes the version information=A be included in the information on the receiving device to notify, to the wireless power transmitting device, that the wireless power receiving device is realized based on the version A standard. On the contrary, the control unit 330 makes the version information=A be not included in the information on the receiving device to notify, to the wireless power transmitting device, that the wireless power receiving device 300 is realized based on not the version A standard but the version B standard. As a result, the wireless power transmitting device may identify which version standard the wireless power receiving device is based on according to whether the version information being included in the information on the receiving device. Herein, the version A and the version B may correspond to a new version and a legacy version, respectively. As described above two versions may be identified by inclusion or non-inclusion of the version information.

That is, since the version is identified by existence of a specific packet (alternatively, signal) in the information of the receiving device, only information of 1 bit may be allocated for the specific packet (alternatively, signal). Therefore, there is an effect that the overhead is reduced. In this case, the control unit 330 may identify the version according to whether the specific signal being input.

As another embodiment, the information on the receiving device may requisitely include the version information of the wireless power receiving device 300. When the version is A, B, or C, the version A, B, or C directly indicates the version of the wireless power receiving device 300 like the version information=A, B, or C.

As yet another embodiment, the information on the receiving device selectively or requisitely includes the version information of the wireless power receiving device and may include other additional information (e.g., a power level required by the wireless power receiving device 300). Herein, the power level required by the wireless power receiving device 300 may be the power level required by the wireless power receiving device 300 itself. Alternatively, when power actually received by the wireless power receiving device 300 is different from required power, the power level may be expressed as information to request rise (+) or drop (−) of transmission power to the wireless power transmitting device. When the rise (+) or the drop (−) of the transmission power is requested, the wireless power transmitting device raises or drops a numerical value of the wireless power currently transmitted by a predetermined amount.

Figure 4:
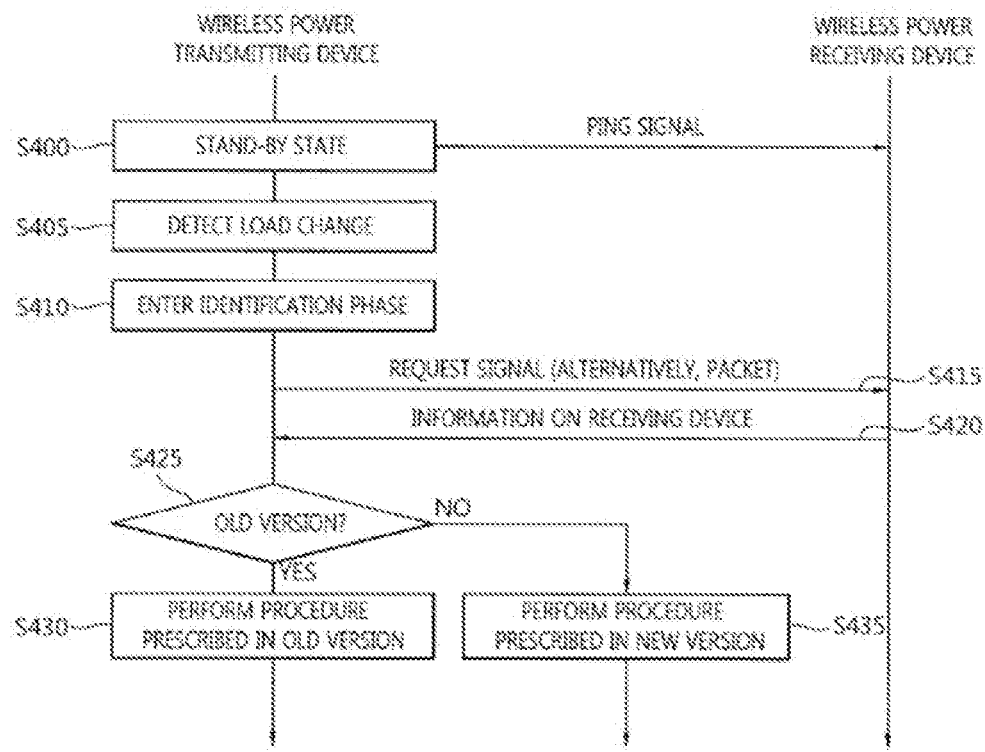
FIG. 4 is a flowchart of a wireless power transmission system according to an embodiment of the present disclosure.

FIG. 4 is a flowchart of a wireless power transmission system according to an embodiment of the present disclosure.

Referring to FIG. 4, the wireless power transmitting device continuously transmits a ping signal in a stand-by state. Herein, the ping signal as a signal used for the wireless power transmitting device to detect the load such as the wireless power receiving device may be called a beacon.

The wireless power transmitting device detects the change of the load to recognize that the load such as the wireless power receiving device exists or the wireless power transmitting device is approached (S405).

Since the wireless power is transmitted when the load is the wireless power receiving device, the wireless power transmitting device enters the identification phase for verifying whether the approached load is the wireless power receiving device and the version of the wireless power receiving device (S410). In this case, the wireless power transmitting device generates a request signal or a request packet for requesting information on the wireless power receiving device and transmits the generated request signal or request packet to the wireless power receiving device (S415). The information on the wireless power receiving device may be called status information of the wireless power receiving device.

In this case, the wireless power receiving device generates the information on the receiving device as a response to the request signal or the request packet and transmits the generated information to the wireless power transmitting device (S420).

As an embodiment, the information on the receiving device may selectively include version information of the wireless power receiving device. The version information is selectively included in the information on the receiving device to identify two versions. For example, when the version information=A is included in the information on the receiving device, the wireless power transmitting device can see that the wireless power receiving device is realized based on the version A standard. For example, when the version information is not included in the information on the receiving device (that is, the version information does not exist in the information on the receiving device), the wireless power transmitting device can see that the wireless power receiving device is realized based on not the version A standard but the version B standard. That is, the wireless power transmitting device may identify which version standard the wireless power receiving device is based on according to whether the version information being included in the information on the receiving device. Herein, the version A and the version B may correspond to a new version and a legacy version, respectively. As described above two versions may be identified by inclusion or non-inclusion of the version information. That is, since the version is identified by existence of a specific packet (alternatively, signal) in the information of the receiving device, only information of 1 bit may be allocated for the specific packet (alternatively, signal). Therefore, there is an effect that the overhead is reduced. In this case, the wireless power receiving device may identify the version according to whether the specific signal being input.

As another embodiment, the information on the receiving device may requisitely include the version information of the wireless power receiving device. When the version is A, B, or C, the version A, B, or C directly indicates the version of the wireless power receiving device like the version information=A, B, or C.

As yet another embodiment, the information on the receiving device includes selectively or requisitely includes the version information of the wireless power receiving device and may include other additional information (e.g., a power level required by the wireless power receiving device). Herein, the power level required by the wireless power receiving device may be the power level required by the wireless power receiving device itself. Alternatively, when power actually received by the wireless power receiving device is different from required power, the power level may be expressed as information to request rise (+) or drop (−) of transmission power to the wireless power transmitting device. When the rise (+) or the drop (−) of the transmission power is requested, the wireless power transmitting device raises or drops a numerical value of the wireless power currently transmitted by a predetermined amount.

The wireless power transmitting device that receives the information on the receiving device determines whether the wireless power receiving device is realized according to the legacy version standard based on the information on the receiving device (S425). For example, the wireless power receiving device checks whether a specific signal corresponding to the version information is input. In addition, when the specific signal is input, the wireless power transmitting device determines that the corresponding wireless power receiving device is realized based on the new version standard and when the specific is not input, the wireless power transmitting device determines that the corresponding wireless power receiving device is realized based on the legacy version standard.

In more detail, in the embodiment in which the version information is selectively included in the information on the receiving device to identify the version, the wireless power transmitting device first verifies whether the version information is included in the information on the receiving device. When the version information=A is included in the information on the receiving device, the wireless power transmitting device determines that the wireless power receiving device is realized based on the version A standard. When the version information=A is not included in the information on the receiving device, the wireless power transmitting device determines that the wireless power receiving device is realized based on the version B standard.

Alternatively, in the embodiment in which the version information directly indicates the version of the wireless power receiving device, in the case of the version information=A, the wireless power transmitting device determines that the wireless power receiving device is realized based on the version A standard and in the case of the version information=B, the wireless power transmitting device determines that the wireless power receiving device is realized based on the version B standard.

In addition, the wireless power transmitting device performs a work or a procedure prescribed in the corresponding version standard (S430 and S435). For example, when it is verified that the wireless power receiving device is realized based on the version A standard, the wireless power transmitting device performs a work or a procedure prescribed in the version A standard. For example, when it is verified that the wireless power receiving device is realized based on the version B standard, the wireless power transmitting device performs a work or a procedure prescribed in the version B standard. As described above, the wireless power transmitting device operates for each version of the wireless power receiving device by a predetermined process to have inter-compatibility even though an information packet which is mutually transmitted and received is changed according to the version.

All of the functions may be performed by processors, a microprocessor, a controller, a microcontroller, an application specific integrated circuit (ASIC), and the like depending on software or a program code coded to perform the functions. Design, development, and realization of the code will be apparent to those skilled in the art based on the description of the present disclosure.

Although the present disclosure has been described with reference to the embodiments as described above, it can be appreciated by those skilled in the art that various modifications and changes of the present disclosure can be made within the scope without departing from the technical spirit and area. Accordingly, the present disclosure is not limited to the aforementioned embodiment and includes all embodiments within the scope of the appended claims.

The invention claimed is:

1. A method performed by a wireless power transmitting device, the method comprising:
    transmitting a power signal;
    detecting an approach of a wireless power receiving device based on a detection of a load change to the power signal;
    transmitting a ping signal to the wireless power receiving device;
    receiving an identification packet from the wireless power receiving device in response to the ping signal;
    determining which version of a standard technical specification is implemented by the wireless power receiving device based, at least in part, on a version field of the identification packet, wherein the wireless power transmitting device supports at least a first version and a second version of the standard technical specification; and
    performing a wireless power transmission operation between the wireless power transmitting device and the wireless power receiving device according to the determined version of the standard technical specification, wherein performing the wireless power transmission operation includes receiving at least one packet that is specific to the second version when the determined version is the second version.

2. The method of claim 1,
    wherein the wireless power transmitting device is configured to support different versions of the standard technical specification depending on which version of the standard technical specification is implemented by the wireless power receiving device.

3. The method of claim 1, wherein determining which version includes determining the version based on a value of a version field in the identification packet.

4. The method of claim 1, wherein determining the determined version includes:
    determining that the wireless power receiving device has implemented a first version of the standard technical specification when the identification packet does not include a version field; and
    determining that the wireless power receiving device implemented a second version of the standard technical specification when the identification packet does include the version field.

5. The method of claim 4, wherein the second version corresponds to a new version of the standard technical specification and the first version is a legacy version.

6. The method of claim 1, further comprising receiving, from the wireless power receiving device, information regarding a level of reception power which the wireless power receiving device receives from the wireless power transmitting device.

7. A wireless power transmitting device comprising:
    a primary coil for transmitting wireless power based on magnetic induction or magnetic resonance;
    an electric drive unit connected to the primary coil and configured to provide an electric drive signal to the primary coil to allow the primary coil to generate the magnetic induction or the magnetic resonance; and
    a control unit connected to the electric drive unit and configured to control the electric drive signal, the control unit further configured to:
    transmit a power signal via the primary coil;
    detecting an approach of a wireless power receiving device based on a detection of a load change to the power signal;
    transmitting a ping signal to the wireless power receiving device;
    receive an identification packet from the wireless power receiving device in response to the ping signal;
    determine which version of a standard technical specification is implemented by the wireless power receiving device based, at least in part, on a version field of the identification packet, wherein the wireless power transmitting device supports at least a first version and a second version of the standard technical specification; and perform a wireless power transmission operation via the primary coil according to the determined version of the standard technical specification, wherein the control unit is further configured to receive at least one packet that is specific to the second version when the determined version is the second version.

8. The wireless power transmitting device of claim 7, wherein the control unit is configured to support different versions of the standard technical specification depending on which version of the standard technical specification is implemented by the wireless power receiving device.

9. The wireless power transmitting device of claim 7, wherein the control unit is configured to determine the version based on a value of a version field in the identification packet.

10. The wireless power transmitting device of claim 7, wherein the control unit configured to determine the determined version includes the control unit configured to:
determine that the wireless power receiving device has implemented a first version of the standard technical specification when the identification packet does not include a version field; and
determine that the wireless power receiving device implemented a second version of the standard technical specification when the identification packet does include the version field.

11. The wireless power transmitting device of claim 10, wherein the second version corresponds to a new version of the standard technical specification and the first version is a legacy version.

12. The wireless power transmitting device of claim 7, wherein the control unit is configured to receive, from the wireless power receiving device, information regarding a level of reception power which the wireless power receiving device receives from the wireless power transmitting device.

* * * * *